Figure 7:
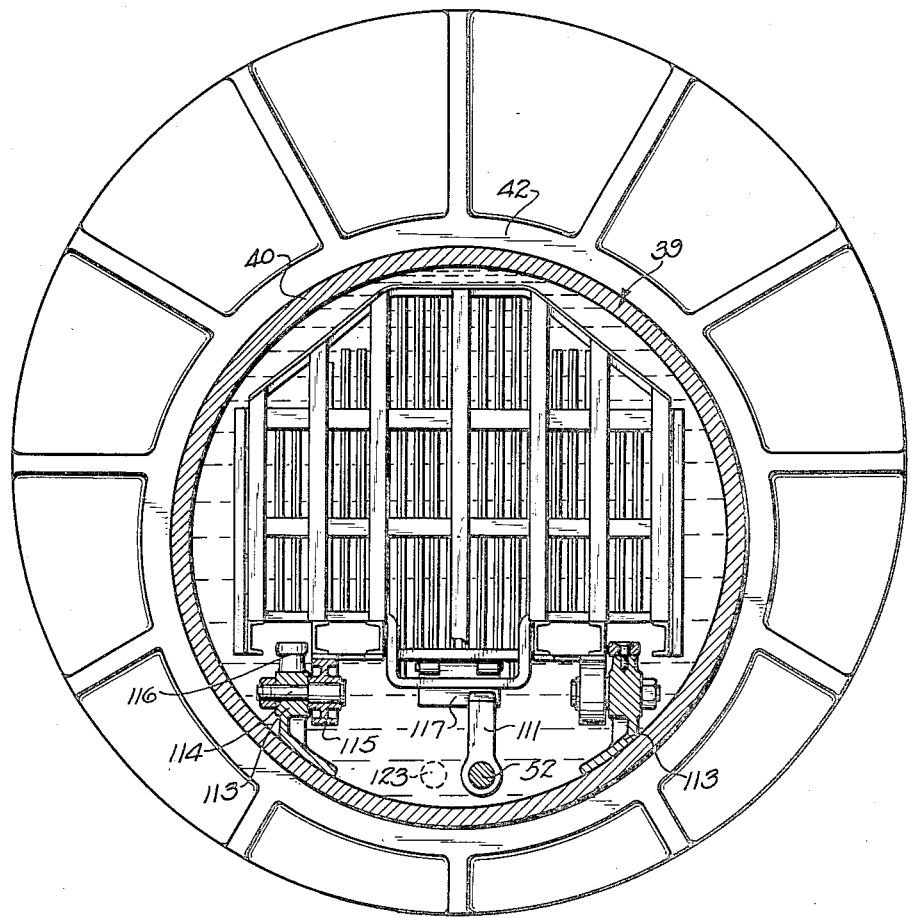

July 3, 1934.   J. L. DRAKE   1,965,113
PRESSING APPARATUS
Filed June 30, 1930   7 Sheets-Sheet 1
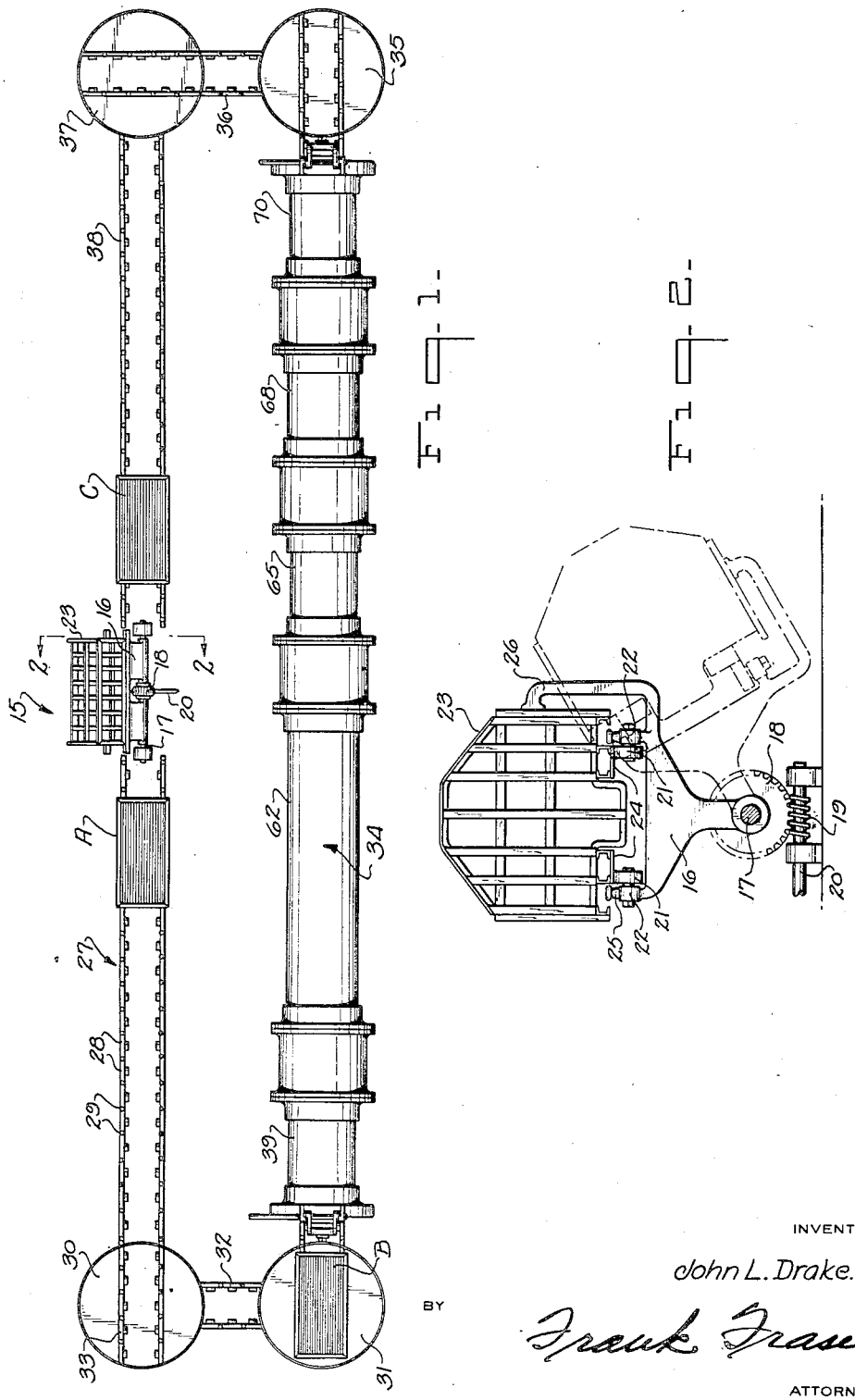
INVENTOR
John L. Drake.
BY Frank Fraser
ATTORNEY

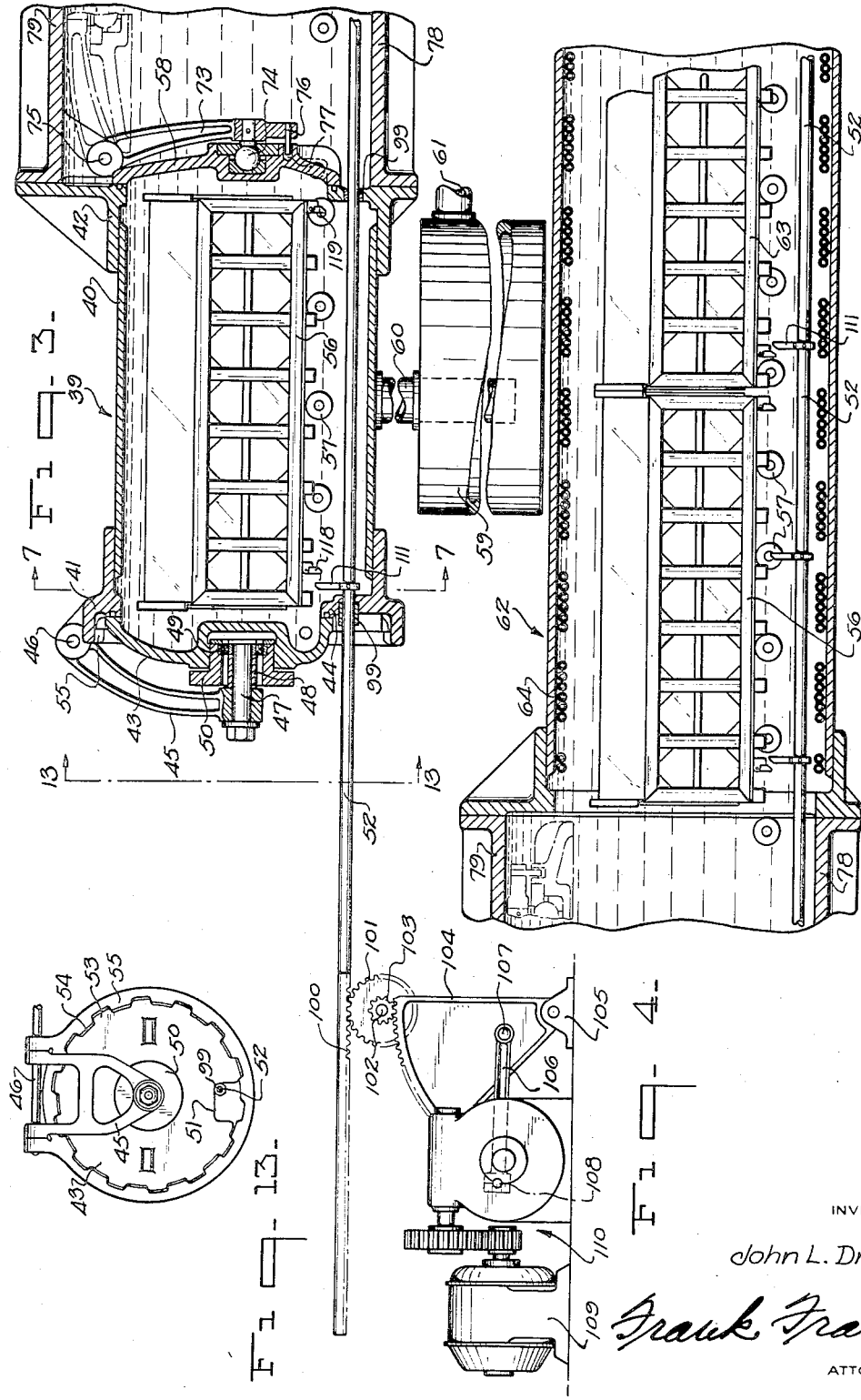

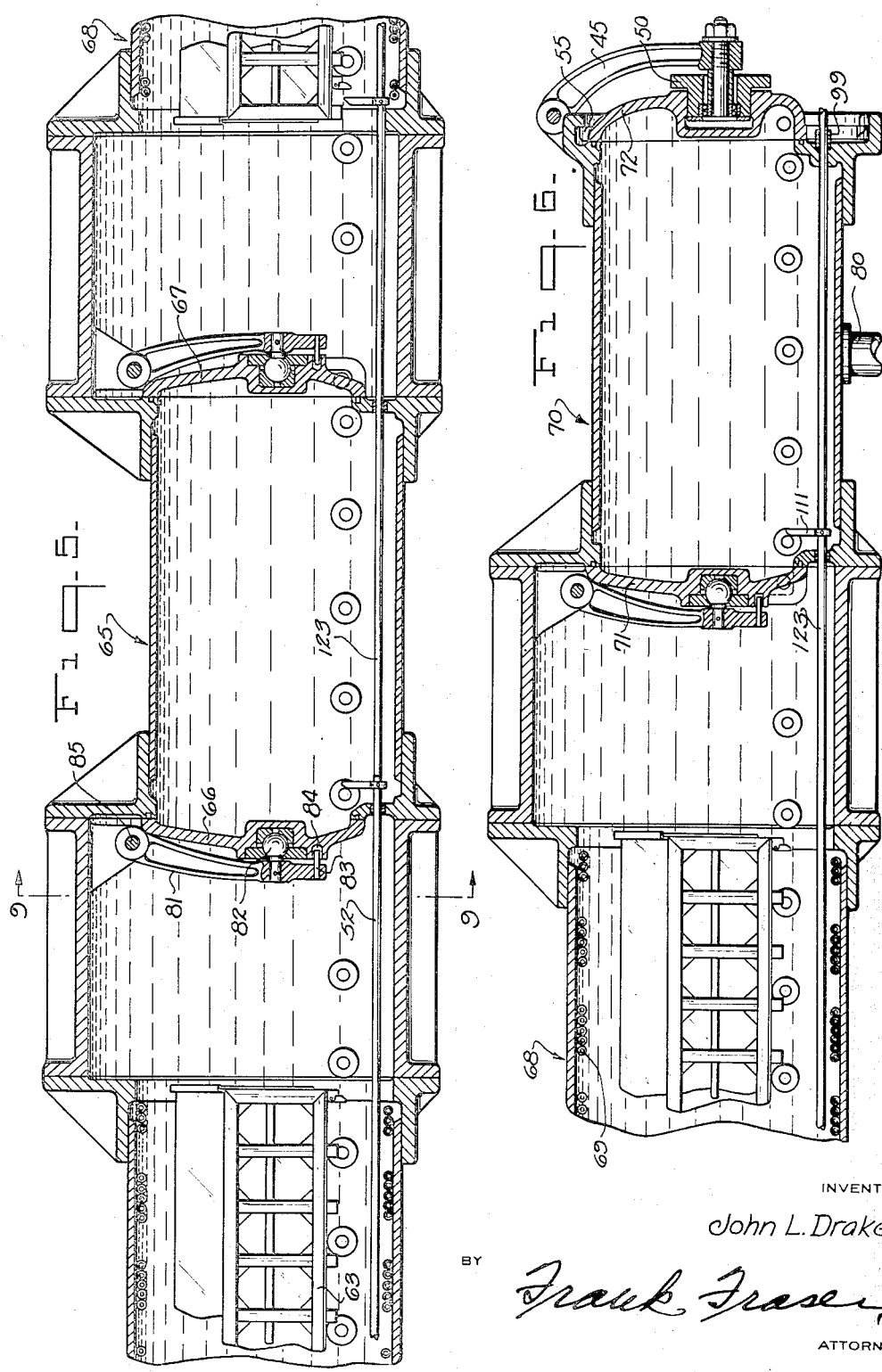

July 3, 1934.     J. L. DRAKE     1,965,113
PRESSING APPARATUS
Filed June 30, 1930     7 Sheets-Sheet 5

INVENTOR
John L. Drake
Frank Fraser
ATTORNEY

Patented July 3, 1934

1,965,113

UNITED STATES PATENT OFFICE 1,965,113

PRESSING APPARATUS

John L. Drake, Toledo, Ohio, assignor to Libbey-Owens-Ford Glass Company, Toledo, Ohio, a corporation of Ohio Application June 30, 1930, Serial No. 464,909

7 Claims. (Cl. 18—17)

The present invention relates to pressing apparatus and particularly to a process and apparatus well adapted for use in the manufacture of laminated or composite glass.

The expression "laminated glass" is used to designate a composite structure ordinarily consisting of two sheets of glass with an interposed plastic membrane all united together to form a composite structure. It is the usual practice to subject the properly treated laminations to the combined action of heat and pressure to get the bond therebetween.

It is an aim of the present invention to provide a process and apparatus whereby the laminations can be properly joined together in a satisfactory and economical manner.

It is a further object of the invention to provide such a process and apparatus wherein fluid pressure is employed as the pressing means and this pressure is so applied and the laminations so handled that a substantially continuous flow of production is had.

Another object of the invention is to provide such a process and apparatus which may be used in the manufacture of laminated or composite glass, such apparatus constituting what I term a station autoclave. Broadly speaking, the station autoclave consists of a series of compartments or chambers through which the sandwiches, created by the superimposition of the laminations, may be moved and subjected to desired pressures and heat treatments to bond the laminations together. The construction and operation of the station autoclave is such that the sandwiches may be introduced into a compartment adapted to contain a fluid under pressure in a manner that the conditions in such compartment are not materially changed, the sandwiches being subjected to the desired pressure, temperature, etc. while in the compartment and then removed therefrom to make room for following sandwiches, the sandwiches being moved from station to station in a substantially continuous manner as will more fully appear hereinafter.

Still another object of the invention is to provide such means wherein various compartments may be designed to have substantially predetermined conditions particularly as regards temperatures, which conditions may be substantially maintained so that the fluid contained in the respective compartments need not be alternately heated or cooled but can be kept within a given temperature range, the sandwiches being introduced into the fluid in a compartment, subjected to the treatment intended, and then removed from the compartment and passed into another compartment where a different treatment can be had. The construction and operation of the autoclave is such that the circulation of the fluid in the various compartments will be thermal in nature and not require pumping or the like, although pumps can be used if preferred.

A still further object of the invention is to provide such means wherein the loading and unloading of the sandwiches into and out of the autoclave will not interrupt the pressing operations so that a material saving in time and cost is had.

Other objects and advantages of the invention will become more apparent during the course of the following description when taken in connection with the accompanying drawings.

Figure 8:
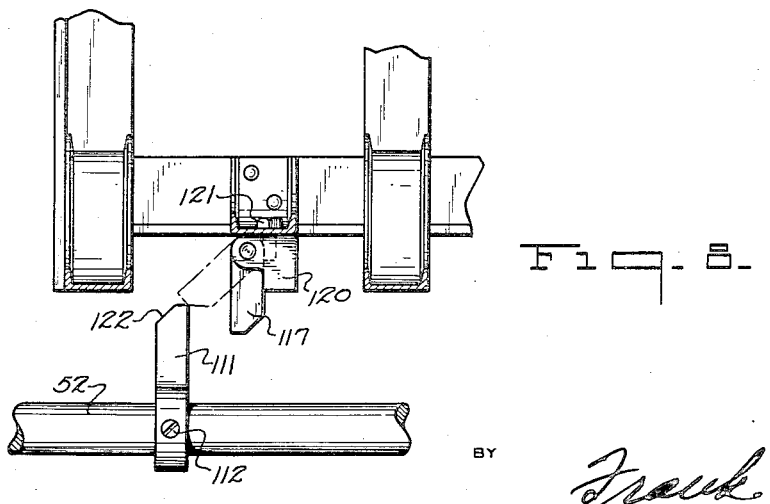
Figure 9:
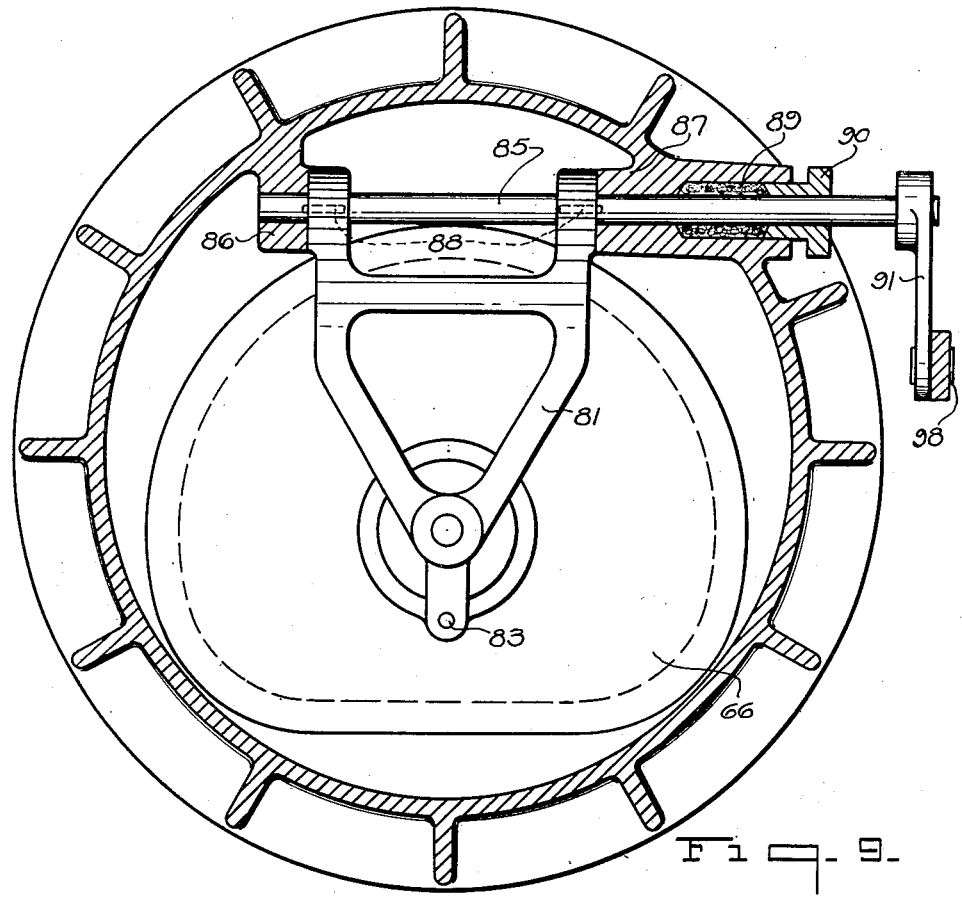
Figure 10:
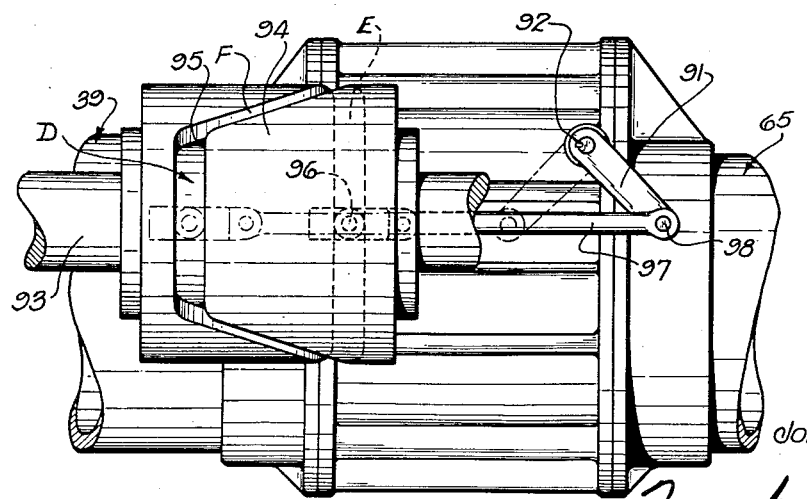
Figure 11:
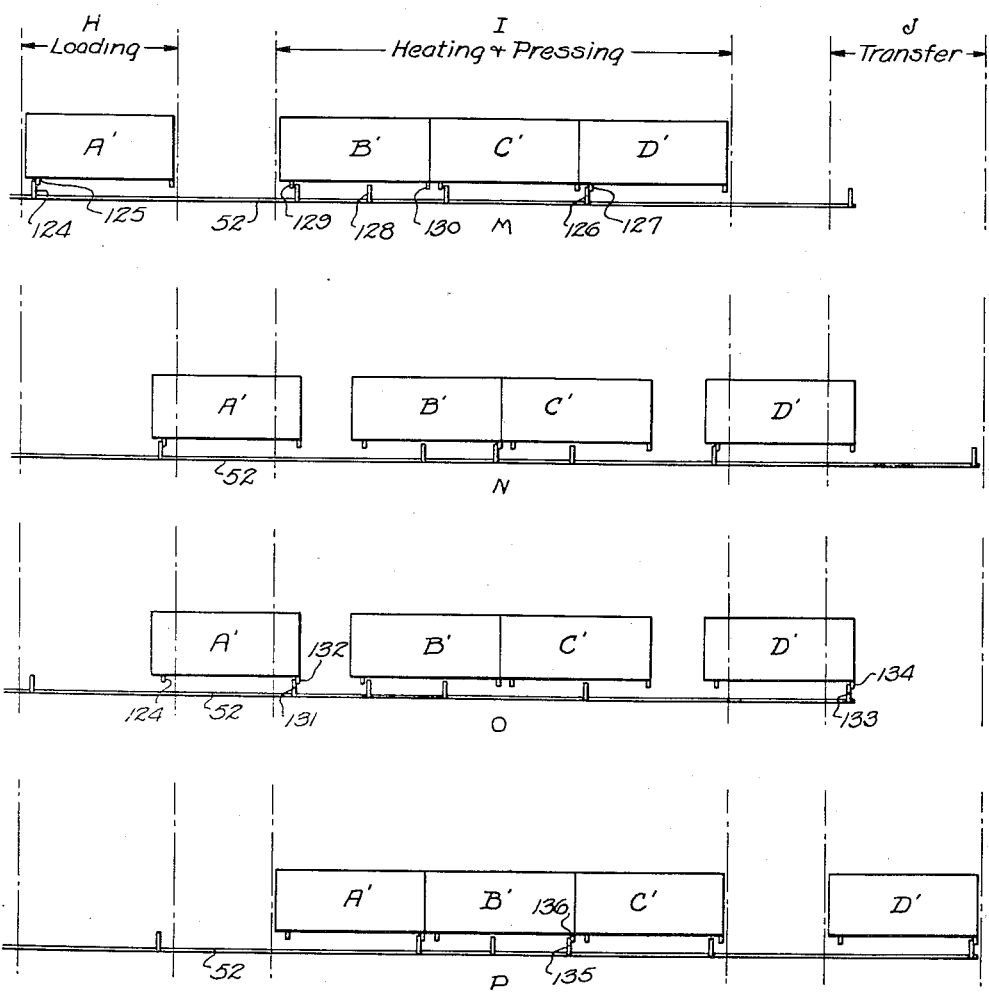
Figure 12:
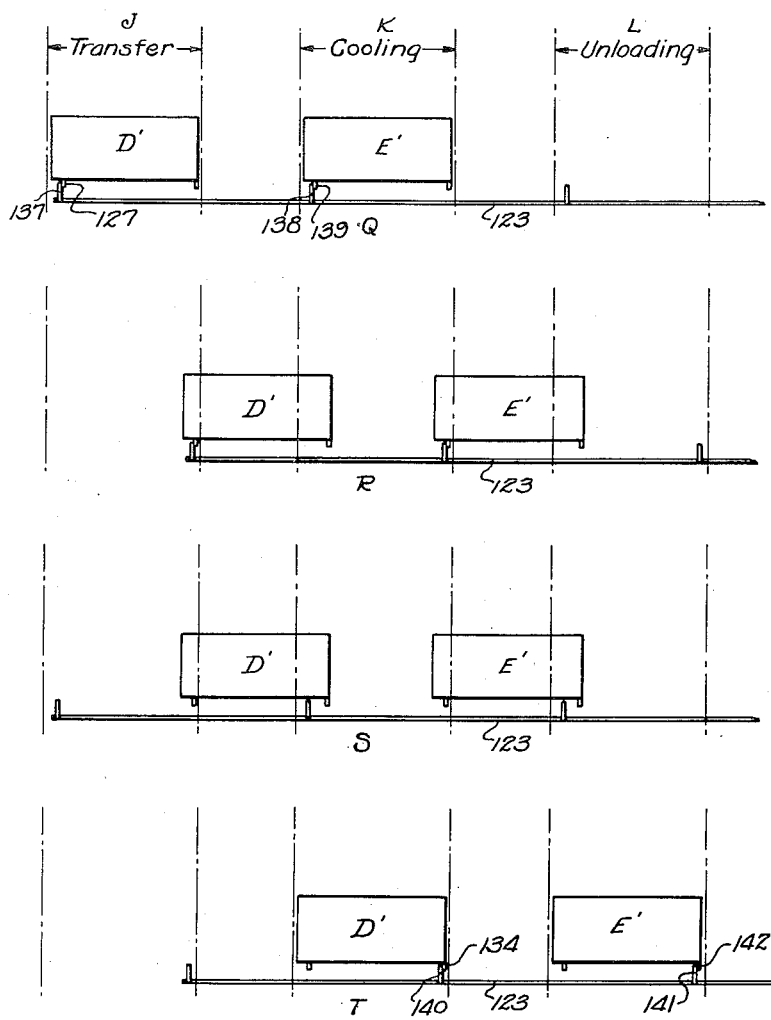

In the drawings wherein like numerals are employed to designate like parts throughout the same, Fig. 1 is a diagrammatic plan view illustrating a system for handling the sandwiches to be joined together, Fig. 2 is a transverse section taken on line 2—2 in Fig. 1, Fig. 3 is a vertical longitudinal section showing the intake end of the autoclave, Fig. 4 is a similar section and is a continuation of Fig. 3, Fig. 5 is also a similar section and is a continuation of the showing in Figs. 3 and 4, Fig. 6 is a same type of section and is a continuation of the apparatus disclosed in Fig. 5 and shows the unloading or exit end of the autoclave, Fig. 7 is a vertical transverse section through the apparatus and is taken on line 7—7 in Fig. 3, Fig. 8 is an enlarged detail of a part of the propelling mechanism, Fig. 9 is another vertical transverse section through the apparatus taken on line 9—9 in Fig. 5, Fig. 10 is an enlarged detail of a portion of the closure operating mechanism, Figs. 11 and 12 are diagrammatic views showing the cycle of movement of the sandwich supporting mechanism through the autoclave, and Fig. 13 is an end view taken on line 13—13 in Fig. 3.

As has already been pointed out, laminated glass is ordinarily formed from two or more sheets of glass and one or more plastic membranes interposed therebetween and united thereto. The present invention is in no way limited to the particular ingredients or process used in the laminated glass per se, but on the other hand relates to a process and apparatus for pressing together the laminations after they have been treated in the desired manner and arranged in the proper superimposed relationship. However, with some processes, it may be desirable to subject the laminations to a so-called preliminary pressing operation before the sandwich thus formed is passed into the autoclave. This preliminary pressing operation may be done by hand, rolls, or the ordinary platen press, and does not constitute a part of the present invention. Further, the sandwiches may be provided with edge protecting means during their passage through the autoclave.

Referring to Figs. 1 and 2, the numeral 15 designates the loading station. As is shown in Fig. 2, the loading station consists of a tiltable frame 16 carried on the shaft 17 which also includes the gear 18 which may be rotated by means of the worm 19 carried on the shaft 20 connected to some suitably controlled source of motive power. The frame 16 is provided with a pair of rollers 21 carried in the journals 22. The rack 23, adapted to support the laminated glass sandwiches, is provided with the trackways 24 adapted to be supported upon and moved over the rolls 21. Vertically disposed guide rollers 25 are also carried by the journals 22 to maintain the frame or rack 23 in proper position upon the roller supporting track 21. It may be well to point out here that the laminated glass sandwiches are preferably held in spaced relation on the rack 23 so that the pressing fluid, which will be discussed hereinafter, will be free to circulate between adjacent sandwiches. An arm 26 is carried by the member 16 and is adapted to bear against the side of the frame 23. As is shown in dotted lines in Fig. 2, the member 16 is adapted to be tilted downwardly and the arm 26 prevents accidental displacement of the rack 23 and the glass carried thereon during this position of the frame. Of course, the frame is moved into the position shown in dotted lines by means of the worm and gear already described. The frame is lowered to this position to permit easy removal and insertion of the laminated glass sandwiches or finished glass, as the case may be, into and out of the rack. After the glass to be pressed has been placed into the rack 23, the frame is moved upwardly so that the rollers or wheels 21 are in horizontal alinement with the track system designated in its entirety by the numeral 27, and which comprises a plurality of spaced rotatable wheels 28 similar to the wheels 21 and the vertical guide rollers 29 similar to the rollers 25. When the rollers 21 are lined up with the rollers 28, the rack 23 may be removed from the member 16 onto the track system 27 and advanced toward the turn table 30. For the sake of clearness, no positive driving means have been illustrated for moving the racks from one place to another. Obviously, these racks may be moved manually or positive driving mechanism may be employed. As disclosed in Fig. 1, the rack A has been loaded with glass on the frame 16 and is being moved toward the turn table 30. In spaced relation to the turn table 30 is a second turn table 31, the two being connected by the track 32. During the time that a rack is being moved from the track 27 to the turn table 30, the track 33, mounted on the turn table 30, is in alinement with the track 27, and when the rack is entirely on the track 33, the turn table 30 is rotated 90 degrees so that the track 33 lines up with the stationary track 32. As shown, the turn table 31 is in horizontal alinement with the station autoclave designated in its entirety by the numeral 34, and the rack B is on the turn table and ready to be introduced into the autoclave. At the opposite end of the autoclave is a third turn table 35 associated with the track 36 similar to the track 32 and a fourth turn table 37. The track 38 is in horizontal alinement with the track 37, and as shown, the rack C is being moved toward the loading and unloading station 15. The glass in the rack C has been through the autoclave 34 and is ready to be unloaded from its rack and cleaned, etc.

Referring to Fig. 3, the numeral 39 designates what may be termed the loading station of the autoclave. The loading station consists of the preferably cylindrical body 40 provided with the ends 41 and 42 respectively. The end 42 includes the closure 43. The closure 43 is illustrated in a closed position and the seal 44 gives a leakproof fit between said closure and the end 41. The door or closure 43 is carried on the arm 45 carried on the shaft 46 which may be rocked to swing the door to and from its closed position which will be fully described later.

The arm 45 has the stub shaft 47 extending therethrough, the shaft 47 carrying the sleeve 48 with which is associated the bearing 49 and the member 50 which is screw-threaded into the door 43. As is shown in Fig. 13, the door 43 is substantially round except for the cut out portion 51. The cut out portion 51 is adapted to straddle the longitudinally disposed shaft 52. The door is provided with the radially extending ears 53 and notches 54, and the ears 53 are adapted to be received in notches formed in the end 41, and then when the door is in the downward position, it is given a slight twist so that the extensions 53 will be received under the ears 55 carried by the end 41. After the door is in this position, locking mechanism is used to firmly hold the door against accidental displacement, this locking mechanism being associated with the shaft 46.

As shown, a rack of glass 56 is arranged in the loading compartment 39 and is supported on the rollers 57 arranged within said compartment. Obviously, the length of the compartment 39 is greater than the length of the rack 56, assuming that the door 43 is in a locked position and likewise the door 58 at the opposite end of the compartment is in a locked position and the rack 56 has just been introduced into the compartment. A tank 59 is associated with the compartment 39 and is connected thereto by the conduit 60. An air line 61 is also connected to the tank 59. When the doors 43 and 58 are in closed position, the fluid used in the pressing operation is forced from the tank 59 into the compartment 39 by a suitable air compressor or the like connected to the conduit 61. While it is not my intention to unnecessarily limit the invention to any particular way of introducing the pressing fluid into and out of the compartments, nevertheless it is pointed out that the air control above described will work satisfactorily. The tank 59 is of sufficient capacity to contain all of the fluid that will be required in the loading compartment 39, and as has already been stated, the location of the pressing fluid is controlled by the air pressure apparatus associated with the pipe 61. Any desired fluid may be used in the autoclave and by way of example, it is mentioned that carbitol can be employed. The carbitol or other fluid is placed under pressure in the loading compartment 39 and in fact is placed at a pressure substantially identical with the pressure of the fluid in the heating and pressing compartment or station designated by the numeral 62.

The heating and pressing compartment 62 is preferably of sufficient length to accommodate a number of the racks of glass 63, and as illustrated in the present drawings, this compartment is capable of containing three such racks of glass at the same time. Arranged within this compartment is a series of coils or other means 64 through which a temperature controlling medium may be circulated. The compartment 63 is adapted to contain the pressing fluid at all times and the apparatus is such that the racks may be passed into and removed from this compartment without materially changing or affecting the characteristics of the fluid therein. For example, the fluid contained within the compartment can be maintained at a substantially predetermined pressure and temperature regardless of whether the doors at both ends of the compartment are closed or open. Located adjacent the exit end of the pressing compartment 62 is a transfer station 65 provided with the closures 66 at the outlet end of the pressing station and door 67 at the intake end of the cooling station 68. The cooling station 68, like the pressing station 62, is provided with the internally disposed conduits 69 through which the desired temperature controlling medium at the proper temperature may be circulated. The cooling station is in turn adjacent to the unloading station 70 and between the two stations is the movable door 71. At the exit end of the loading station is a door 72 similar in construction to the door 43 of the loading station 39.

Referring again to the loading station 39, as has already been pointed out, when the doors 43 and 58 have been locked by a mechanism that will be described in detail later on, the fluid such as carbitol is placed under pressure in the compartment 39, and it is preferred that the pressure of the fluid in said compartment be brought up to a pressure substantially the same as the pressure of the fluid in the compartment 62. At the proper time during the cycle after these conditions have been set up, the door 58 is opened.

The door 58 is opened from the position illustrated in full lines in Fig. 3 and moved into a position indicated by the dotted lines in said figure. The door 58 is carried on the arm 73 by means of the ball and socket joint 74, the opposite end of the arm 73 being keyed to the shaft 75. A pin 76 is carried by the lower end of the arm 73 and is adapted to be received in a recess 77 formed in the door. The numeral 78 designates what may be termed a door compartment because as is shown, this compartment 78 is of a greater size than the size of the compartments 39 or 62. This additional size in the drawings shown is at the top 79 to allow sufficient space for the door when in an open position so that the door will not hinder the movement of the rack 56 and glass thereon from the loading compartment to the heating and pressing compartment.

Even though there is a substantial fluid pressure in the compartment 62, the door 58 can be opened because there is a similar pressure in the compartment 39. The racks of glass are then moved through the heating and pressing compartment and into the transfer compartment 65 illustrated in Fig. 5. The construction and operation of the doors 66 and 67 associated with this transfer compartment is similar to that of the door 58 already described in detail. When it is desired to transfer a rack of glass, the door 66 is opened and the rack passed into the transfer chamber. As illustrated, the transfer chamber is of sufficient length to readily accommodate a single rack of glass. However, it will be appreciated that the size of the racks as well as the size of the compartment will determine the number of racks which can be positioned in any one compartment at a given time. As a matter of fact, the numbers, etc. given in the present specification are by way of example only and are not to be construed as words of limitation. After the rack of glass is in the chamber 65, the door 66 may be closed and the door 67 may then be opened. The rack of glass may then be passed into the cooling chamber or compartment 68. With such an arrangement of doors and chambers, it is possible to transfer a rack of glass from the heating and pressing compartment to the cooling compartment without materially affecting the temperature conditions in either compartment. At the proper time the rack of glass is adapted to be passed into the unloading station 70. At such time the chamber 70 is filled up with fluid through the conduit 80 in a manner similar to that used in connection with the loading station 39. When the fluid is under a pressure in the chamber 70 substantially the same as the pressure in the chamber 68, the door 71 may be opened and the rack of glass passed thereinto. The door 71 may then be closed and the fluid be removed from the chamber 70 so that the door 72 may be swung open and the rack of glass passed from the autoclave. The glass will then pass on the turn table as disclosed in Fig. 1 and is then ready to be returned to the loading station 15 where the glass may be removed from the racks and new glass to be pressed placed in the racks and so on.

Figs. 9 and 10 show in detail the operating mechanism used for the various doors or closures associated with the compartments. The particular door disclosed in Fig. 9 is the door 66 of Fig. 5, the door being carried by the arm or bracket 81 by means of the ball and socket connection 82. The pin 83 is received in the recess 84 of the door to prevent twisting thereof. While the doors 43 and 72 are substantially round, the remaining doors inside of the autoclave are not round, but assume the shape such as disclosed in Fig. 9, although obviously the shape of the doors can be varied to suit conditions which will be somewhat determined by the character of the racks used for the glass and supporting and conveying means therefor.

The arm or bracket 81 is keyed to the shaft 85 running transversely of the autoclave. The shaft 85 is journaled in the portions 86 and 87 respectively carried by the autoclave and extends beyond the journal portion 87. Keys 88 are used to key the arm 81 to the shaft 85 so that upon rotation of the shaft, the door will be swung into and out of a closed position. Suitable packing 89 is associated with the journal 87 and retained in position by the member 90. Carried by the outer end of the shaft 85 is the link 91 which is illustrated in Fig. 10 as well as Fig. 9. The link 91 is keyed to the shaft 85 as at 92.

As disclosed in Fig. 10, a horizontally disposed shaft 93 extends along the exterior of the autoclave and at spaced points carries a cam operating device 94. There is a cam operating device carried on the shaft 93 for each of the various doors or closures in the autoclave. The member 94 is provided with a cam trackway 95 adapted to receive a roller 96 carried on a pitman 97 pivoted to the link 91 on the shaft 98. The position of the various elements in full lines in Fig. 10 is the position thereof when the door 66 is in closed position. When it is desired to open the door, the shaft 93 is rotated sufficiently to cause the roller 96 to be moved into the cammed groove 95 so that the various links, etc. assume the positions illustrated in dotted lines in Fig. 10. It will be noted that the groove 95 is provided with the straight pathways D and E which permit a dwell of the roller therein for quite a time without affecting the position of the door. It is when the roller is being passed in the inclined or oblique portions F of the groove that the door is being swung either to an open or a closed position. It will be understood that the shaft 93 may extend the entire length of the autoclave and be provided with a member 94 for each door, or a series of suitably timed shafts may be provided instead of a single long member. In any event, the shaft 93 is provided with an operating mechanism not illustrated. The door operating mechanism is not disclosed in Fig. 1, because Fig. 1 is a diagrammatic plan view designed to show the passage of the glass sheets from the glass loading and unloading station around through the autoclave and back to its starting point.

Referring now to the means for propelling the racks through the autoclave, the shaft 52 has already been mentioned. As is shown in Fig. 3, the shaft 52 is adapted to pass through the autoclave in the journals 99. The outside end of the shaft 52 is provided with the rack part 100 which meshes with a pinion 101 carried on the shaft 102 together with the little pinion 103 adapted to mesh with the segmental gear 104 pivoted to the base 105. A connecting rod 106 is pivoted at 107 to the segmental gear 104 and to a crank shaft 108. A motor 109 and reducing gearing 110 are used to drive this mechanism.

Carried on the shaft 52 at spaced points are upstanding fingers 111. As is shown in Fig. 8, the fingers 111 are keyed to the shaft by means of set screws or the like 112.

Arranged within the autoclave is a plurality of wheel supports 113 welded or otherwise secured to the walls of said autoclave. The supports 113 carry the shaft 114 on which are carried the rollers 115 adapted to contact with the tracks formed on the racks as has already been explained. The brackets 113 likewise carry the upstanding guide rollers 116. As is clearly illustrated in Fig. 7, a pivoted depending plate 117 is carried by the rack and as a matter of fact, each rack has such a pivoted plate at both ends thereof. For example, in Fig. 3, the rack 56 is provided with the pivoted plate 118 at one end and the plate 119 at the opposite end. Each plate is pivoted to the member 120 bolted to the rack by means of the bolts 121. Fig. 8 illustrates in heavy lines the trigger member or plate 117 when it is in its normal position, and in dotted lines the trigger is disclosed as in contact with the fingers 111. One corner of the trigger 117 may be beveled to correspond to the beveled edges 122 of the fingers. By beveling the contacting edges, undue wear, etc. is averted. It will be clear from the disclosure in Fig. 8 that the fingers 111 can be moved past the trigger 117 in one direction without affecting the position of the rack due to the fact that the trigger will pivot upwardly and will allow passage of the finger thereunder. On the other hand, if the finger is moved in the opposite direction, the trigger will abut the member 120 and cause movement of the rack.

The shaft 52 does not extend the entire length of the autoclave but works at the front end only. A second shaft 123 operates at the opposite end and is provided with the same sort of operating mechanism as that associated with the shaft 52. It will be noted that the elements associated with the shaft 52 operate to push the racks of glass through the autoclave, while the similar elements associated with the shaft 123 operate to pull the racks through the autoclave.

Figs. 11 and 12 have been provided to illustrate in a diagrammatic way a cycle of operation that can be used in the handling of the autoclave. Column H in Fig. 11 represents the passage of a rack of glass through the loading compartment 39; column I represents the heating and pressing chamber 62; and column J represents the transfer compartment 65. The column J is illustrated in both Figs. 11 and 12. Column K is for the cooling section 68, while column L is used to designate the unloading chamber 70. Fig. 11 has been divided into four lines M, N, O, and P respectively, while Fig. 12 has been divided into four lines Q, R, S, and T respectively.

Referring to line M of Fig. 11, it will be seen that the rack A' is positioned within the loading station H. At the same time there are three racks B', C', and D' arranged in the heating and pressing zone I. It will be understood that the various zones referred to in this view correspond to the sections or chambers of the autoclave. Assuming that the glass in the rack D' has been subjected to the desired heating and pressing action, it is of course desirous to remove such rack from the zone I and pass it through the transfer, cooling, and unloading zones. Therefore, the rack A' has been placed in the loading station by proper manipulation of the doors associated therewith. After the rack A' has been placed in the loading zone and fluid pressure created therein substantially identical with similar conditions in the heating and pressing zone, the doors may be opened by manipulation of the shaft 93 as has already been explained. After the doors have been opened, the motor 109 is operated to move the shaft 52 forwardly. It will be noted that the finger 124 carried on the shaft 52 is in contact with the trigger 125 on the rack A'. It will be noted that the finger 126 is also in contact with the trigger 127, but that none of the other fingers and triggers are in operative association. Therefore, at the beginning of the stroke of the shaft 52, racks A' and D' are the only ones moved. However, it will be noted that the finger 128 is approximately midway between the triggers 129 and 130 on the table B' so that as the rod 52 is advanced forward far enough, this finger and trigger will engage in a manner to shove racks B' and C' forwardly, but not to the same extent as the movement of the racks A' and D'. Referring now to line N, this line represents the position of the respective tables after the shaft 52 has been operated through one stroke of the cycle. It will be noted that rack A' is partially in the loading and partially in the heating and pressing zone, while rack D' is partially in the heating and pressing zone and partially in the transfer zone. On the other hand, the racks B' and C' are both still entirely in the heating and pressing zone. The rod 52 is then retracted to the position indicated in line O. It will of course be understood that the shaft 52 can be retracted, that is, moved from right to left of the mechanism as disclosed in the drawings, without affecting the position of the various racks by reason of the finger and trigger mechanism such as is illustrated particularly in Figs. 7 and 8 of the drawings. When the shaft 52 is in the position indicated in line O, the finger 131 is in operative association with the trigger 132 on the rack A'. The finger 133 on the shaft 52 is also in operative association with the trigger 134 on the rack D', while none of the fingers are in shoving position with respect to the triggers on racks B' and C'. Upon movement of the shaft 52, the rack A' will be moved completely into the heating and pressing zone, while the rack D' will be completely disposed in the transfer zone J. As shown in line P, during forward movement of the shaft 52 on the second stroke of its cycle, it will be seen that the finger 135 engages the trigger 136 on the rack B', thereby shoving racks B' and C' into the position illustrated by the end of the stroke. The arrangement of the fingers is such that rack A' is also brought into contact or at least in close proximity to the rack B'.

With the cycle of operation disclosed in Figs. 11 and 12, at the time the shaft 52 is being operated to move the racks through the forepart of the autoclave, the shaft 123 is not being operated. The shaft 52 has therefore placed the rack D' in the transfer section J. The shaft 23 is then used to pull the racks through the transfer station, cooling station, and unloading station. On the first stroke of the shaft 23, it will be noted that the finger 137 abuts the trigger 127 on the rack D', while the finger 138 is in operative association with the triggers 139 on the rack E', which has been in the cooling section. The first stroke of the shaft 123 moves the racks into the positions illustrated in line R of Fig. 12, and it will be seen that the rack D' is partially in the transfer zone and partially in the cooling zone, while the rack E' is partially in the cooling zone and partially in the unloading zone. The shaft 123 is then moved back to its original position without further affecting the position of the racks D' and E', and upon the second stroke of the shaft, the finger 140 engages the trigger 134 on the rack D', while the trigger 141 engages the trigger 142 on the rack E', as indicated in line T.

It will thus be seen that the rack D' has been moved from the transfer section into the cooling section or zone, while the rack which was originally in the cooling zone has been moved into the unloading zone. The rack may then be removed from the unloading and returned to the loading station disclosed in Fig. 1 where the glass may be removed and cleaned, and otherwise prepared for actual use.

Figs. 11 and 12 represent one cycle that can be used in the movement of the racks through the autoclave, but this is not the only cycle that can be used, because in reality the cycle employed will be dependent upon the character of treatment it is desired to give the sandwiches passing through the autoclave. For example, in some instances it may be possible that the cooling zone will not be required or desired. Likewise, the time of treatment in the various zones may be varied. Thus, it will be understood that the operation of the various doors and location and operation of the cam operating door mechanism, shafts 52 and 123, etc. can be adjusted and controlled to give the desired cycle of operation.

While the present specification may seem lengthy and indicate a complicated mechanism, nevertheless the autoclave herein described is relatively very simple in construction and operation and permits of an economical production of laminated glass in a substantially continuous manner. For example, if a single compartment or tank is used in an autoclave in the production of laminated glass, there is considerable time lost in the loading and unloading of the glass into and out of such autoclave. Obviously, during the time that loading and unloading is taking place, no pressing of the glass is had. Likewise, if the glass is to be subjected to heating and pressing and also a cooling stage, it is necessary to have a heat exchanger system with a consequent change of temperature within the autoclave. As compared to the present so-called station autoclave, the production of a single compartment type is relatively low.

With the station autoclave just described, it is possible to load and unload the autoclave without interfering with the pressing operations. Furthermore, by separating the heating and pressing zone from the cooling zone, it is unnecessary to have alternate heating and cooling in any given zone as set conditions can be substantially maintained, thereby facilitating a more rapid and efficient processing of the laminated glass. An important part of the invention resides in the building up of pressure on both sides of the doors inside of the autoclave so that these doors may be operated without disturbing the pressing of the glass. The loading chamber 39 and the unloading chamber 70 are the only two chambers which need to have the fluid removed at any time and the removal of the fluid from these two chambers can be worked out very easily so that, practically speaking, the autoclave as a whole contains the fluid under pressure at all times. In view of the transfer sections provided, there is very little intermingling of the fluid from the heating and pressing zone with that of the cooling zone.

Pressures and temperatures are not set forth herein because they will vary with the particular process employed in the production of laminated glass, and it is sufficient to point out that any temperatures and pressures ordinarily used in the manufacture of laminated glass can be set up and maintained within the autoclave. The operation of the pusher shafts 52 and 123 and the operation of the shaft 93 carrying the door operating mechanism may be manual, or automatic devices can be utilized if preferred.

The various sections of the autoclave can be joined together by means of rivets or welding, although obviously care should be taken to provide leak-proof joints insofar as it is possible to do so. It is pointed out again that it is considered preferable to arrange the sandwiches of glass in the racks in spaced relation so that the fluid used as the pressing medium can circulate freely between adjacent sandwiches.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. An autoclave of the character described, comprising a loading chamber, a movable closure associated with each end thereof, a pressing chamber associated with one end of the loading chamber, means for placing a fluid under pressure in the pressing chamber, means for placing a fluid in the loading chamber under pressure, and means for opening the closure between the loading and pressing chamber when fluid under pressure is disposed in each chamber.

2. An autoclave of the character described, comprising a loading station, an unloading station, and one or more intermediate chambers positioned between the loading and unloading stations, said intermediate chamber or chambers being adapted to contain a fluid under pressure, means for introducing a fluid into and removing the same from the loading station and for placing said fluid under pressure at the desired time, similar means associated with the unloading station, movable closure means interposed between the loading and unloading stations and the intermediate chamber or chambers, and additional closure means associated with the opposite ends of said loading and unloading stations.

3. An autoclave of the character described, comprising a loading station, an unloading station, and one or more intermediate chambers positioned between the loading and unloading stations, said intermediate chamber or chambers being adapted to contain a fluid under pressure, means for introducing a fluid into and removing the same from the loading station and for placing said fluid under pressure at the desired time, similar means associated with the unloading station, movable closure means interposed between the loading and unloading stations and the intermediate chamber or chambers, additional closure means associated with the opposite ends of said loading and unloading stations, and means for controlling the temperature of the fluid in said intermediate chamber or chambers.

4. An autoclave of the character described, comprising a loading station, an unloading station, and one or more intermediate chambers positioned between the loading and unloading stations, said intermediate chamber or chambers being adapted to contain a fluid under pressure, means for introducing a fluid into and removing the same from the loading station and for placing said fluid under pressure at the desired time, similar means associated with the unloading station, movable closure means interposed between the loading and unloading stations and the intermediate chamber or chambers, additional closure means associated with the opposite ends of said loading and unloading stations, and means for advancing the articles to be pressed into and through the loading station, intermediate chamber or chambers and the unloading station.

5. An autoclave of the character described, comprising a loading station, an unloading station, and one or more intermediate chambers positioned between the loading and unloading stations, said intermediate chamber or chambers being adapted to contain a fluid under pressure, means for introducing a fluid into and removing the same from the loading station and for placing said fluid under pressure at the desired time, similar means associated with the unloading station, movable closure means interposed between the loading and unloading stations and the intermediate chamber or chambers, additional closure means associated with the opposite ends of said loading and unloading stations, and operating means for opening and closing the closure means when the pressure on both sides of said closure means is substantially the same.

6. The process of producing laminated glass, consisting in suitably treating the laminations, then arranging them in proper superimposed relationship, then placing the sandwich thus formed in a chamber adapted to contain a fluid under pressure, subjecting the sandwich to the desired pressure in said chamber, then passing the sandwich from the chamber into an adjacent chamber also adapted to contain fluid under pressure, the chambers being separated by a movable closure, the sandwich being transferred from the first to the second chamber when the fluid pressure is substantially the same in both chambers, and then passing the sandwich through successive chambers of similar character until it has been subjected to the desired pressing treatment.

7. The process of producing laminated glass, consisting in suitably treating the laminations, then arranging them in proper superimposed relationship, then placing the sandwich thus formed in a chamber adapted to contain a fluid under pressure, subjecting the sandwich to the desired pressure in said chamber, then passing the sandwich from the chamber into an adjacent chamber also adapted to contain fluid under pressure, the chambers being separated by a movable closure, the sandwich being transferred from the first to the second chamber when the fluid pressure is substantially the same in both chambers, and then passing the sandwich through successive chambers of similar character until it has been subjected to the desired pressing treatment.

JOHN L. DRAKE.